United States Patent
Su et al.

(10) Patent No.: US 11,536,437 B2
(45) Date of Patent: Dec. 27, 2022

(54) BACKLIGHT MODULE AND DISPLAY DEVICE FOR PRIVACY PROTECTION

(71) Applicants: HannStar Display (Nanjing) Corporation, Nanjing (CN); HannStar Display Corporation, Taipei (TW)

(72) Inventors: Chen-Hao Su, Taichung (TW); Chia-Feng Teng, Tainan (TW); Chin-Yung Liu, Tainan (TW)

(73) Assignees: HannStar Display (Nanjing) Corporation, Nanjing (CN); HannStar Display Corporation, Taipei (TW)

( * ) Notice: Subject to any disclaimer, the term of this patent is extended or adjusted under 35 U.S.C. 154(b) by 0 days.

(21) Appl. No.: 17/661,280

(22) Filed: Apr. 28, 2022

(65) Prior Publication Data
US 2022/0381417 A1    Dec. 1, 2022

(30) Foreign Application Priority Data
Jun. 1, 2021 (CN) .......................... 202110609119.9

(51) Int. Cl.
| | | |
|---|---|---|
| G02F 1/1335 | (2006.01) |
| F21V 23/00 | (2015.01) |
| F21V 5/02 | (2006.01) |
| F21V 5/00 | (2018.01) |
| F21V 19/00 | (2006.01) |
| G02F 1/13357 | (2006.01) |

(52) U.S. Cl.
CPC ................ *F21V 5/02* (2013.01); *F21V 5/007* (2013.01); *F21V 19/006* (2013.01); *F21V 23/003* (2013.01); *G02F 1/133603* (2013.01); *G02F 1/133607* (2021.01); *G02F 1/133608* (2013.01)

(58) Field of Classification Search
CPC .......... F21V 5/002; F21V 5/005; F21V 5/007; F21V 23/003–009; G02F 1/133602–166314
See application file for complete search history.

(56) References Cited

U.S. PATENT DOCUMENTS

| | | | |
|---|---|---|---|
| 2007/0188711 A1* | 8/2007 | Sharp ................... | H04N 13/334 353/8 |
| 2016/0195238 A1* | 7/2016 | Han ........................ | G02B 6/12 362/335 |
| 2021/0103187 A1* | 4/2021 | Woodgate .......... | G02B 19/0028 |

* cited by examiner

*Primary Examiner* — Sean P Gramling
(74) *Attorney, Agent, or Firm* — CKC & Partners Co., LLC

(57) ABSTRACT

The backlight module includes multiple backlight units. Each backlight unit includes a first light emitting unit and multiple second light emitting units. The first light emitting unit has a first beam angle, and each second light emitting unit has a second beam angle which is narrower than the first beam angle. In a first mode, a light intensity of the first light emitting unit is equal to a first intensity, and a light intensity of the second light emitting units is equal to a second intensity. In a second mode, the light intensity of the first light emitting unit is equal to a third intensity, and the light intensity of the second light emitting units is equal to a fourth intensity. The first intensity is greater than the third intensity, and the second intensity is less than the fourth intensity.

17 Claims, 8 Drawing Sheets

BACKLIGHT MODULE AND DISPLAY DEVICE FOR PRIVACY PROTECTION

RELATED APPLICATIONS

This application claims priority to China Application Serial Number 202110609119.9 filed Jun. 1, 2021, which is herein incorporated by reference.

BACKGROUND

Field of Invention

The present disclosure relates to a backlight module for privacy protection. More particularly, the present disclosure relates to the backlight module having two kinds of light emitting units.

Description of Related Art

An application of a display panel is to meet the requirement of privacy protection. Such a display panel can reduce the contrast of left and right viewing angles and thus have a relatively narrow viewing angle. In the prior art, microstructures are formed on a light guide plate with a prism having reversed microstructures to meet the requirements of privacy protection.

SUMMARY

Embodiments of the present disclosure provide a backlight module for privacy protection. The backlight module includes multiple backlight units. Each of the backlight units includes a first light emitting unit and multiple second light emitting units. The first light emitting unit has a first beam angle. The size of each of the second light emitting units is smaller than the size of the first light emitting unit. Each of the second light emitting units has a second beam angle which is narrower than the first beam angle. In the first mode, the light intensity of the first light emitting unit is equal to the first intensity, and the light intensity of the second light emitting units is equal to a second intensity. In a second mode, the light intensity of the first light emitting unit is equal to a third intensity, and the light intensity of the second light emitting units is equal to a fourth intensity. The first intensity is greater than the third intensity, and the second intensity is less than the fourth intensity.

In some embodiments, the first beam angle is greater than or equal to 120 degrees and less than or equal to 160 degrees. The second beam angle is greater than or equal to 15 degrees and less than or equal to 40 degrees.

In some embodiments, the first light emitting unit has a first maximum light intensity, and the second light emitting units have a second maximum light intensity. The first intensity is 100% of the first maximum light intensity, and the second intensity is less than or equal to 20% of the second maximum light intensity. The third intensity is greater than or equal to 25% of the first maximum light intensity and less than or equal to 50% of the first maximum light intensity. The fourth intensity is 100% of the second maximum light intensity.

In some embodiments, a number of the second light emitting units is equal to four, and the first light emitting unit is disposed between two of the second light emitting units and between other two of the second light emitting units.

In some embodiments, the backlight units include a first backlight unit and a second backlight unit which is adjacent to the first backlight unit. Orientation of the four second light emitting units of the second backlight unit is rotated 45 degrees relative to orientation of the four second light emitting units of the first backlight unit.

In some embodiments, each of the backlight units further includes a support unit which is disposed on the first light emitting unit, and the area of a lower surface of the support unit is less than the area of an upper surface of the first light emitting unit.

In some embodiments, the backlight module further includes an optical structure disposed above the support unit and directly contacting the support unit.

In some embodiments, the support unit is a polygonal frustum having an upper surface and a lower surface. The upper surface of the polygonal frustum is rotated a particular degree relative to the lower surface of the polygonal frustum, and the particular degree is greater than 0 degree.

In some embodiments, the area of the upper surface of the polygonal frustum is less than or equal to half the area of the lower surface of the polygonal frustum. The area of the lower surface of the polygonal frustum is greater than or equal to one-tenth the area of the upper surface of the first light emitting unit and less than or equal to four-fifths the area of the upper surface of the first light emitting unit.

In some embodiments, the particular degree is equal to 45 degrees.

In some embodiments, the lower surface of the polygonal frustum has an inner circle, a diameter of the inner circle is equal to y micrometer, the polygonal frustum has a height of x micrometer, and x is 0.5 to 1 times of y.

In some embodiments, in the second mode, a viewing angle formed by the backlight units is greater than or equal to 30 degrees and less than or equal to 45 degrees.

From another aspect, embodiments of the present disclosure provide a display device including a back plate, a middle frame disposed on the back plate, a substrate encompassed by the back plate, and the aforementioned backlight units disposed on the substrate.

In some embodiments, the display device further includes multiple optical structures supported by the middle frame.

In some embodiments, the optical structures include a light guide plate, a diffuser, or a polarizer.

In some embodiments, each of the backlight units further includes a support unit which is disposed on the first light emitting unit, and one of the optical structures directly contacts the support unit.

In some embodiments, a gap is formed between one of the optical structures and the support unit.

In some embodiments, reflective material is formed on the upper surface of the substrate.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. The using of "first", "second", "third", etc. in the specification should be understood for identifying units or data described by the same terminology but are not referred to particular order or sequence.

Figure 1:
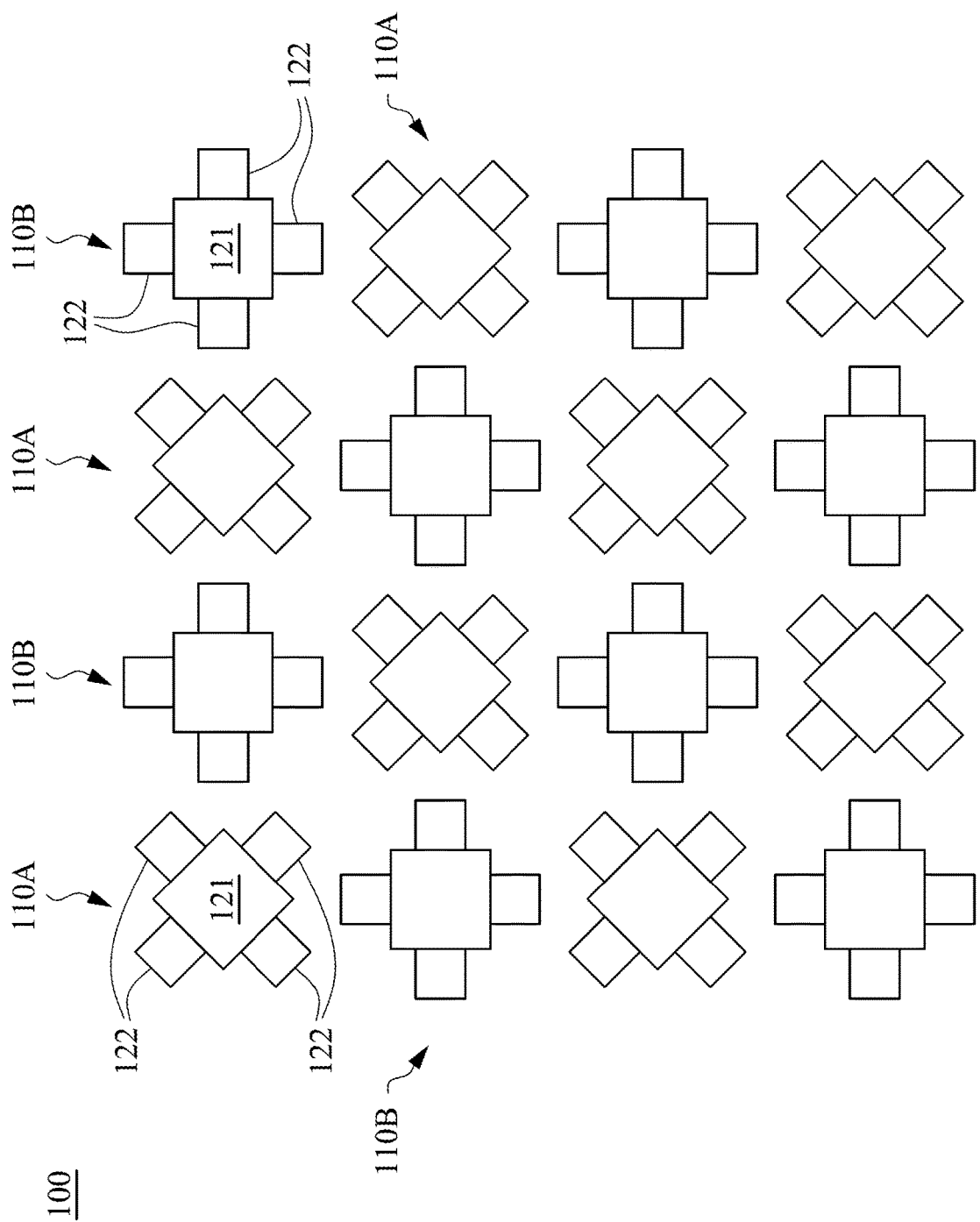
FIG. 1 is a top view of a backlight module in accordance with an embodiment.
Figure 2:
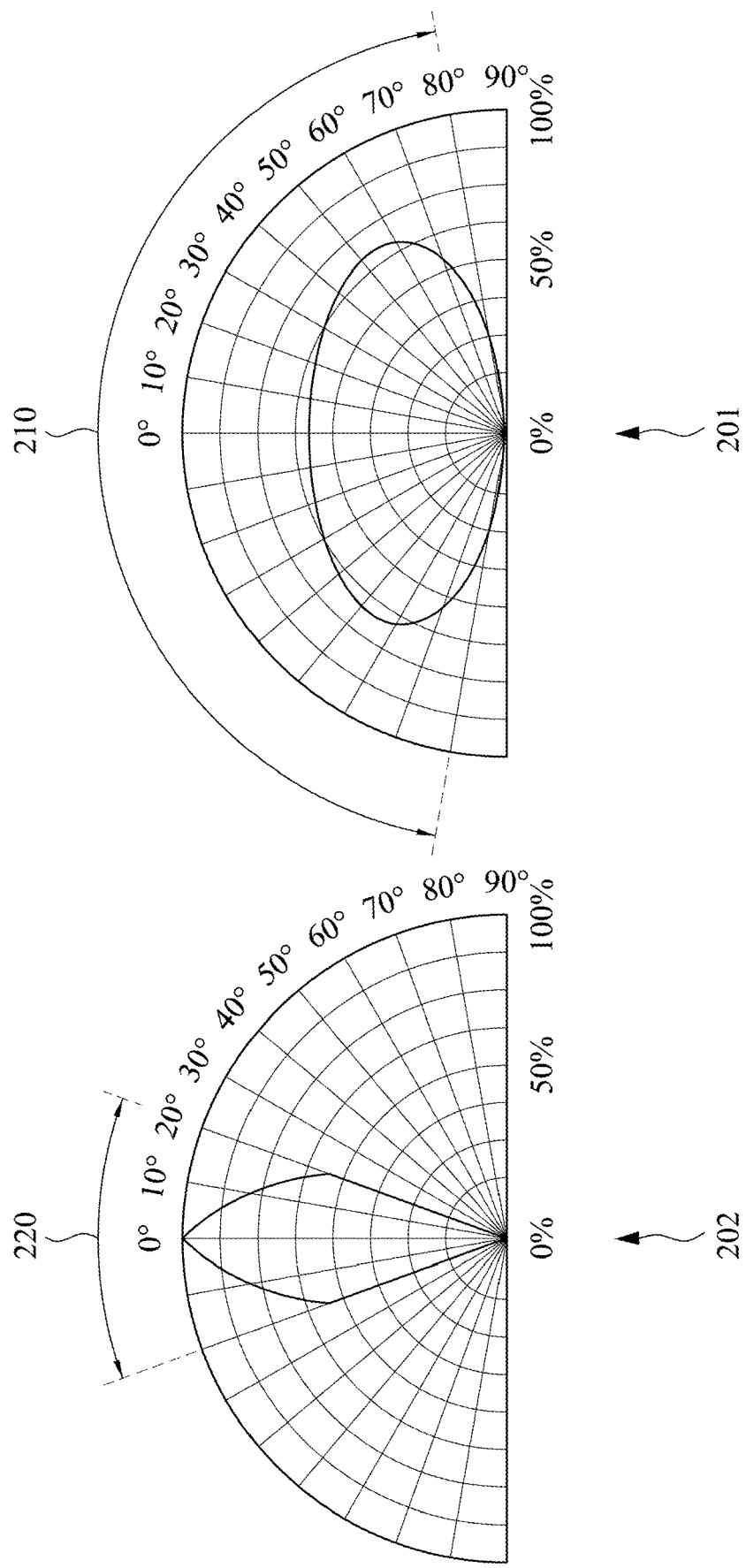
FIG. 2 is a diagram illustrating light distribution curves of light emitting units in accordance with an embodiment.

FIG. 1 is a top view of a backlight module in accordance with an embodiment. Referring to FIG. 1, a backlight module 100 includes multiple backlight units which are divided into first backlight units 110A and second backlight units 110B based on orientation. Each backlight unit includes two kinds of light emitting units: a first light emitting unit 121 and four second light emitting units 122. These light emitting units are, for example, light-emitting diodes (LEDs), and the size thereof can be in the order of millimeters, micrometers or nanometers which are not limited in the disclosure. In particular, the sizes of the second light emitting units 122 are smaller than the size of the first light emitting unit 121, and the beam angle of the second light emitting units 122 is narrower than the beam angle of the first light emitting unit 121. Light distribution curves of the first light emitting units 121 and the second light emitting units 122 are illustrated in FIG. 2 in which a first light distribution curve 201 corresponds to the first light emitting units 121, and a second light distribution curve 202 corresponds to the second light emitting units 122. The beam angle is defined as a degree within which the light intensity is greater than a predetermined value. In the embodiment, a beam angle 210 of the first light emitting units 121 is equal to 160 degrees, and a beam angle 220 of the second light emitting units 122 is equal to 40 degrees. In some embodiments, the beam angle of the first light emitting units 121 is greater than or equal to 120 degrees and less than or equal to 160 degrees, and the beam angle of the second light emitting units 122 is greater than or equal to 15 degrees and less than or equal to 40 degrees.

Figure 3:
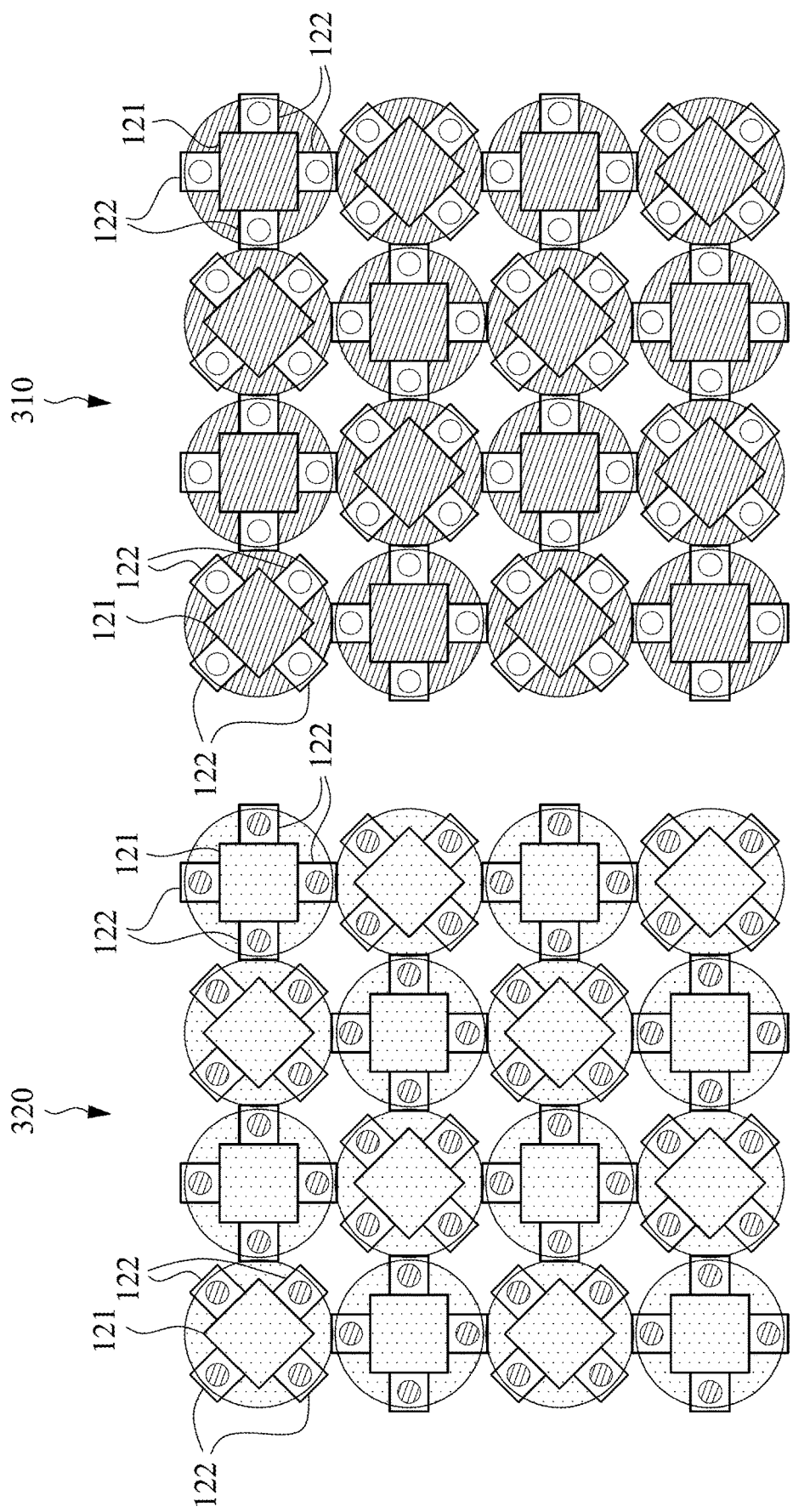
FIG. 3 is a schematic diagram illustrating two modes in accordance with an embodiment.

The backlight module 100 can operate in two modes. FIG. 3 is a schematic diagram illustrating the two modes in accordance with an embodiment. A first mode 310 is also referred to as a normal mode for providing a light source with a wide viewing angle. In the normal mode, a light intensity (also referred to as a first intensity) of the first light emitting units 121 is relatively larger, and a light intensity (also referred to as a second intensity) of the second light emitting units 122 is relatively smaller. A second mode 320 is also referred to as a privacy mode for providing a light source with a narrow viewing angle. In the privacy mode, the light intensity (also referred to as a third intensity) of the first light emitting units 121 is relatively smaller, and light intensity (also referred to as a fourth intensity) of the second light emitting units 122 is relatively larger. Note that the descriptions of "relatively larger" and "relatively smaller" indicate the comparison between the first light emitting unit 121 (second light emitting unit 122) and itself instead of the comparison between the first light emitting unit 121 and the second light emitting unit 122. In other words, the aforementioned first intensity is greater than the third intensity, and the second intensity is less than the fourth intensity. Whether the first intensity is greater than the second intensity and whether the third intensity is greater than the fourth intensity are not limited in the disclosure.

In some embodiments, the first to fourth intensities are represented as percentages of a maximum light intensity of the corresponding light emitting unit. To be specific, the first light emitting units 121 have a first maximum light intensity. The first intensity is, for example, 100% of the first maximum light intensity, and the third intensity is greater than or equal to 25% of the first maximum light intensity and less than or equal to 50% of the first maximum light intensity. On the other hand, the second light emitting units 122 have a second maximum light intensity. The second intensity is less than or equal to 20% of the second maximum light intensity, and the fourth intensity is equal to 100% of the second maximum light intensity. From another aspect, in the first mode 310, the first light emitting units 121 emit light at the first maximum light intensity, and the second light emitting units 122 emit light at 0-20% of the second maximum light intensity. In some embodiments, the second light emitting units 122 may be turned off in the first mode 310. In the second mode 320, the second light emitting units 122 emit light at the second maximum light intensity. Since the beam angle of the second light emitting units 122 are relatively narrower, a dark region of each backlight unit is relatively larger, and therefore the first light emitting units 121 are turned on and emit light at 25%-50% of the first maximum light intensity for compensating the dark region. In the second mode 320, due to the compensation performed by the first light emitting unit 121, an effective beam angle (also referred to a viewing angle) of the first light emitting units 121 plus the second light emitting units 122 is greater than the beam angle of the second light emitting units 122 themselves. In some embodiments, the viewing angle according to all backlight units in the second mode 320 is greater than or equal to 30 degrees and less than or equal to 45 degrees that means the light intensity within this viewing range is greater than a predetermined value.

Figure 4:
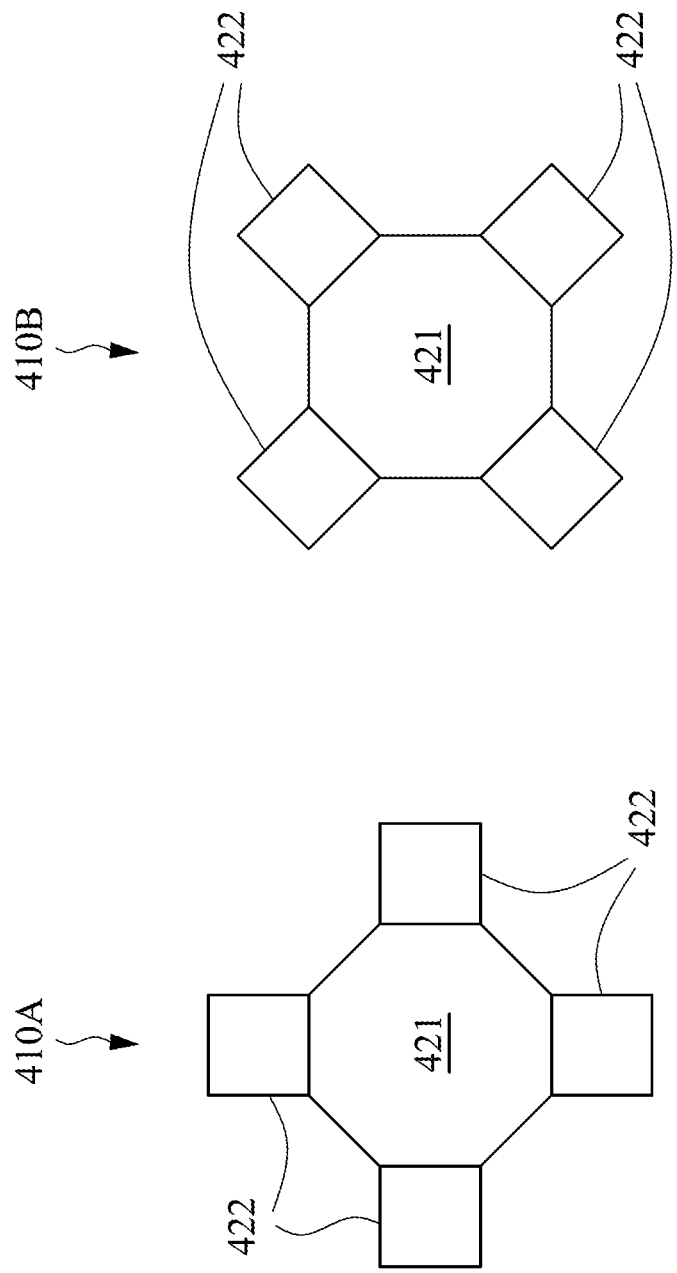
FIG. 4 is a schematic diagram illustrating backlight units in accordance with an embodiment.

In the embodiments of FIG. 1 and FIG. 3, each first light emitting unit 121 has a shape of a quadrilateral in the top view, and the corresponding four second light emitting units 122 are disposed on the four sides of the quadrilateral respectively. In some embodiments, each first light emitting unit 121 may have a shape of a circle, an octagon, or other polygons. For example, in the embodiment of FIG. 4, the first light emitting unit 421 has a shape of the octagon in the top view. In the first backlight unit 410A, four second light emitting units 422 are disposed on the upper side, the lower side, the left side and the right side respectively. In the second backlight unit 410B, four second light emitting units 422 are disposed on the upper left side, the lower left side, the upper right side, and the lower right side respectively. From another aspect, in the embodiment of either FIG. 1 or FIG. 4, each first light emitting unit is disposed between two second light emitting units and between other two second light emitting units. In some embodiments, each backlight unit may have more or less second light emitting units, and the positions of the second light emitting units are not limited in the disclosure.

In the embodiment of FIG. 1, the first backlight units 110A and the second backlight units 1108 are arranged alternatively, and that is each first backlight unit 110A is adjacent to at least one second backlight unit 1108, and each second backlight unit 1108 is adjacent to at least one first backlight unit 110A. Each second backlight unit 1108 is rotated 45 degrees (clockwise or counterclockwise) relative to the adjacent first backlight unit 110A. In other words, orientation of the four second light emitting unit 122 of the second backlight unit 1108 is rotated 45 degrees relative to orientation of the four second light emitting unit 122 of the first backlight unit 110A. Due to the different orientation of the first backlight unit 110A and the second backlight unit 1106, the backlight module 100 can provide uniform light intensity.

Figure 5:
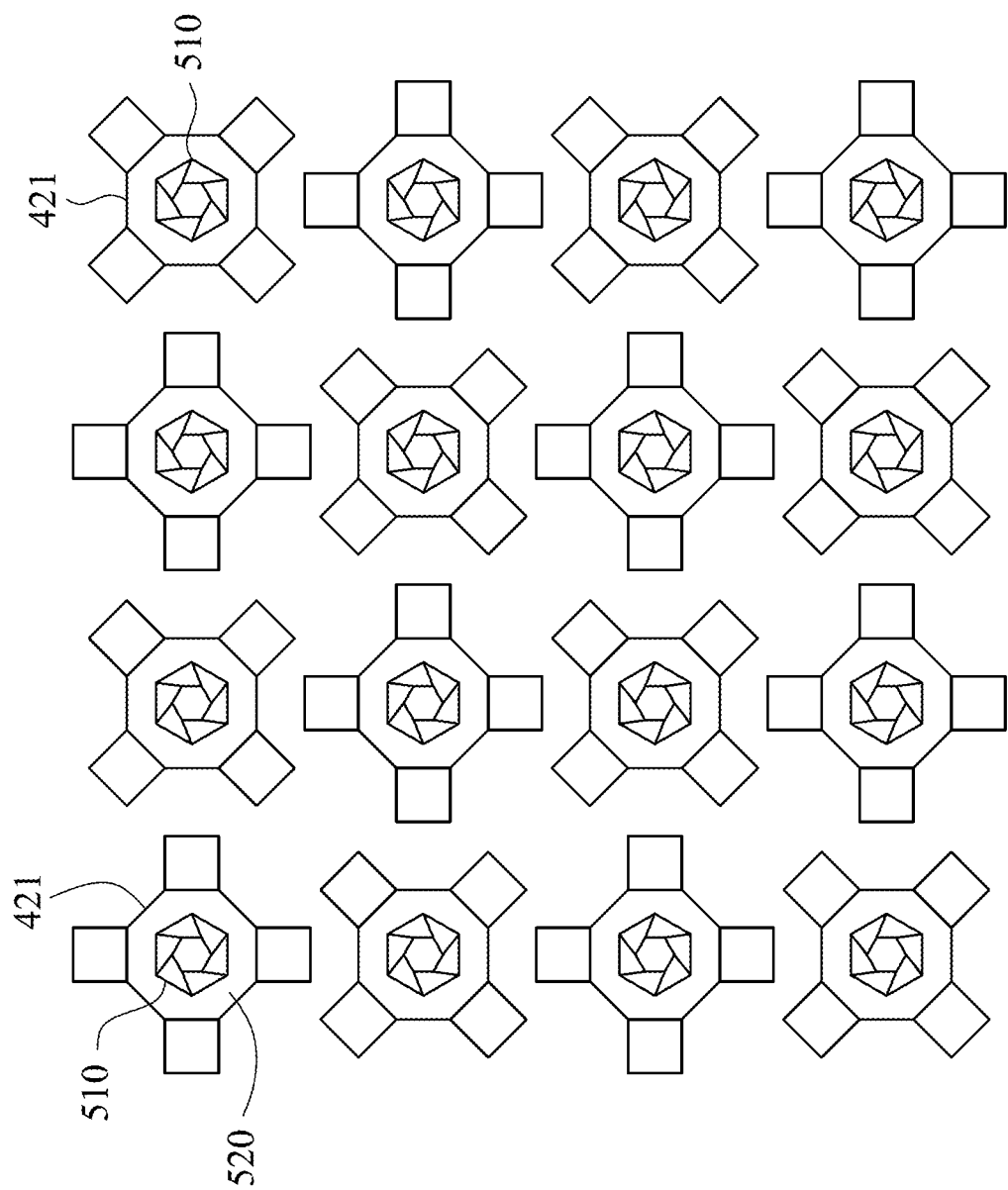
FIG. 5 is a top view of the backlight module in accordance with an embodiment.

FIG. 5 is a top view of the backlight module in accordance with an embodiment. In the embodiment of FIG. 5, each backlight unit also includes a support unit 510 disposed on the first light emitting unit 421. The support unit 510 may also be disposed on the first light emitting unit 121 of FIG. 1. The support unit 510 is made of transparent material for spreading the light from the first light emitting unit 121/421 and making the light more uniform. In some embodiments, the area of a lower surface (e.g. a lower surface 620 of FIG. 7) of the support unit 510 is smaller than the area of an upper surface 520 of the first light emitting unit 421. In some embodiments, the lower surface of the support unit 510 is larger than or equal to one-tenth the area of the upper surface 520 of the first light emitting unit 421 and is less than or equal to four-fifths the area of the upper surface 520 of the first light emitting unit 421.

Figure 6:
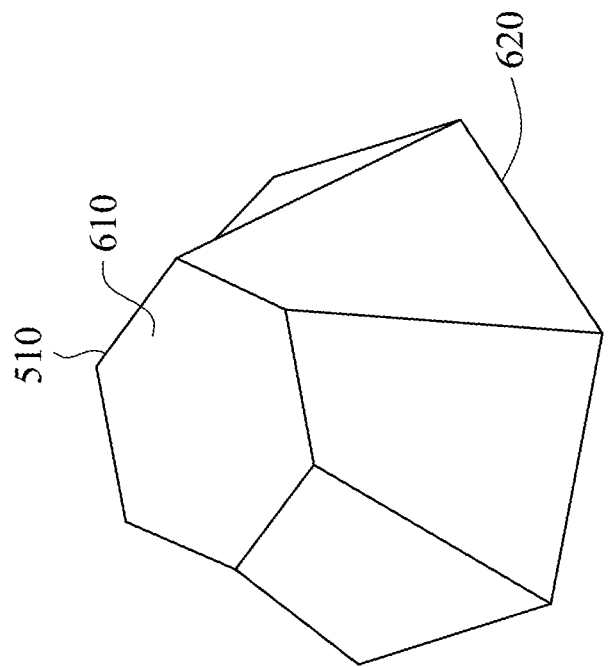
FIG. 6 is a perspective view of a support unit 510 in accordance with an embodiment.
Figure 6:
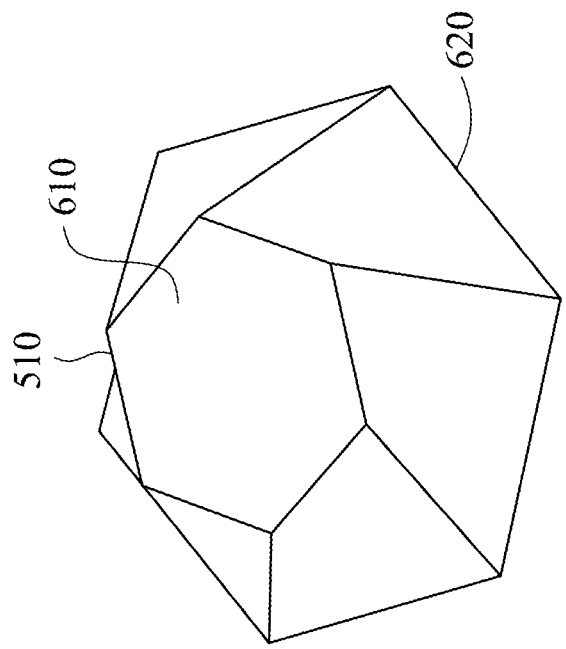
Figure 7:
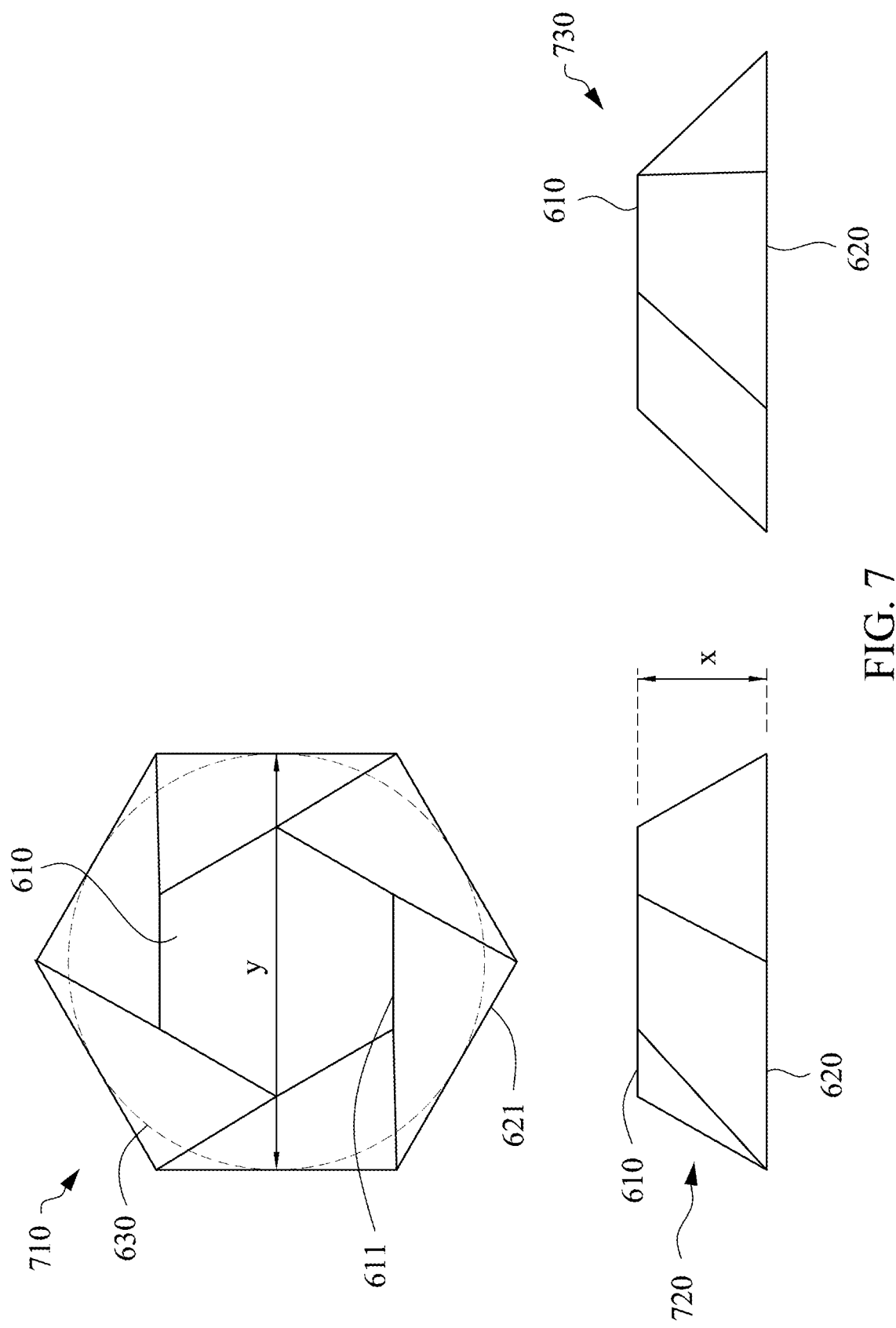
FIG. 7 is diagram illustrating a top view and a side view of the support unit in accordance with an embodiment.

FIG. 6 is a perspective view of the support unit 510 in accordance with an embodiment. FIG. 7 is a diagram illustrating a top view and a side view of the support unit in accordance with an embodiment. Referring to FIG. 6 and FIG. 7, two embodiments of the support unit 510 are illustrated in FIG. 6 with different heights. A top view 710, a front view 720 and a side view 730 from the right-hand side are illustrated in FIG. 7. In these embodiments, the support unit 510 is a polygonal frustum which means an upper surface 610 and a lower surface 620 of the support unit 510 are polygons such as hexagons, but the disclosure is not limited thereto. Note that the upper surface 610 is rotated a particular degree relative to the lower surface 620. The particular degree (e.g. 45 degrees) is greater than 0 degree. This kind of "twisted" polygonal frustum can spread the light from the first light emitting unit uniformly. From another aspect, sides of the upper surface 610 correspond to sides of the lower surface 620 respectively. For example, a side 611 corresponds to a side 621. However, the side 611 is not parallel to the side 621 when viewed from the normal vector of the upper surface 610 (i.e. in the top view).

The lower surface 620 has an inner circle 630 (e.g. an inscribed circle). The diameter of the inner circle 630 is equal to y micrometers. The polygonal frustum has a height of x micrometers. In some embodiments, x is 0.5 to 1 times of y. In some embodiments, the area of the upper surface 610 is less than or equal to half the area of the lower surface 620.

Figure 8:
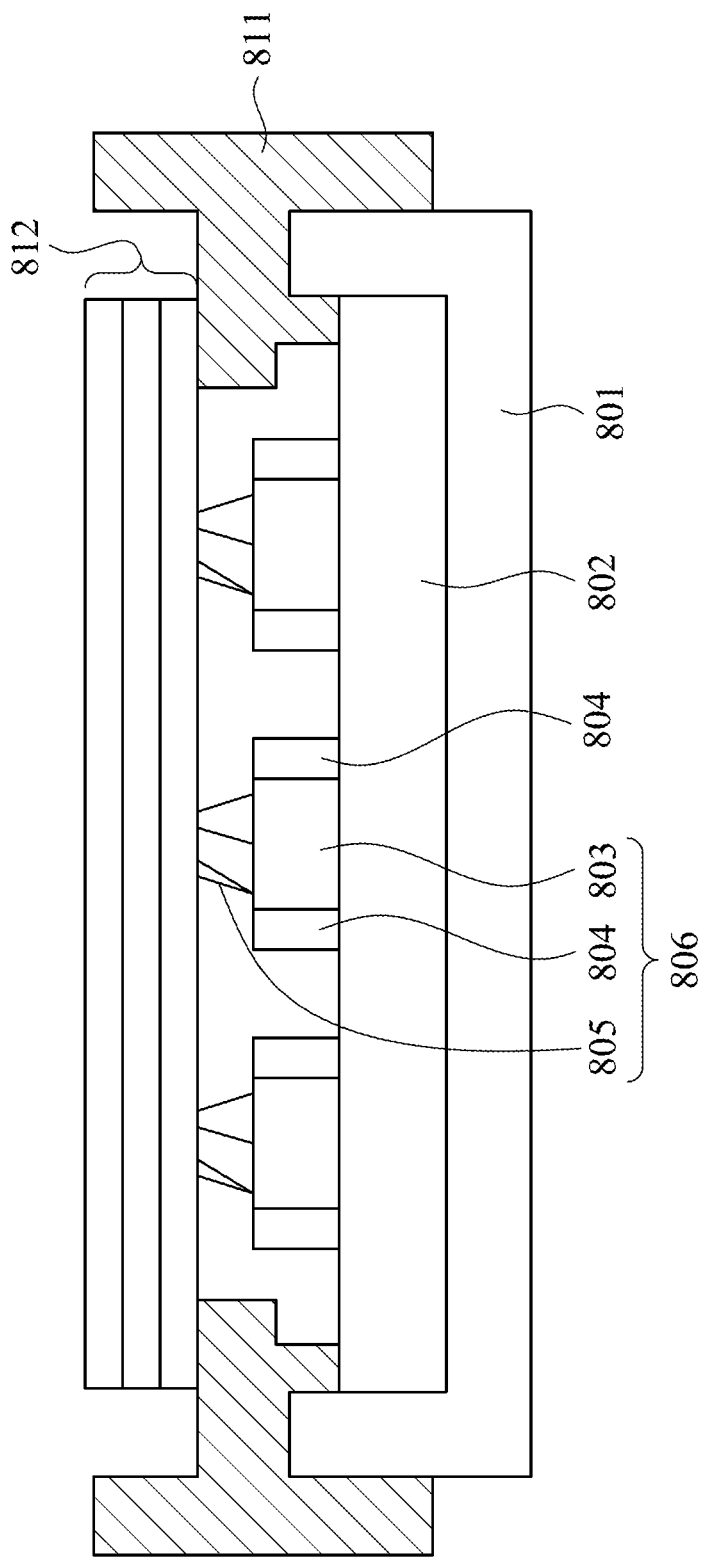
FIG. 8 is a diagram illustrating a display device in accordance with an embodiment.

FIG. 8 is a diagram illustrating a display device in accordance with an embodiment. Referring to FIG. 8, a display device includes a back plate 801, a substrate 802, multiple backlight units 806, a middle frame 811 and multiple layers of optical structures 812. For simplification, not all units of the display device are illustrated in FIG. 8. Multiple backlight units 806 are disposed on the substrate 802 which is encompassed by the back plate 801. The middle frame 811 is disposed on the back plate 801 to support the optical structures 812. Each backlight unit 806 includes a first light emitting unit 803, multiple second light emitting units 804 and a support unit 805 that have been described in detail above, and therefore the description thereof will not be repeated. In some embodiments, reflective material (not shown) is formed on the upper surface of the substrate 802. The optical structures 812 may include a light guide plate, a diffuser, a polarizer or the combination thereof. In the embodiment, the optical structures 812 are disposed above the support unit 805, and one of the optical structures 812 directly contacts the support unit 805. In other embodiments, the support unit 805 does not contact the optical structures 812, and thus a gap is formed between the support unit 805 and one of the optical structures 812.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module for privacy protection, the backlight module comprising:
a plurality of backlight units, wherein each of the backlight units comprises:
a first light emitting unit having a first beam angle;
a plurality of second light emitting units, wherein a size of each of the second light emitting units is smaller than a size of the first light emitting unit, each of the second light emitting units has a second beam angle which is narrower than the first beam angle; and
a support unit disposed on the first light emitting unit, wherein the support unit is a polygonal frustum having an upper surface and a lower surface, the upper surface of the polygonal frustum is rotated a particular degree relative to the lower surface of the polygonal frustum, and the particular degree is greater than 0 degree,
wherein in a first mode, a light intensity of the first light emitting unit is equal to a first intensity, and a light intensity of the second light emitting units is equal to a second intensity,
wherein in a second mode, the light intensity of the first light emitting unit is equal to a third intensity, and the light intensity of the second light emitting units is equal to a fourth intensity,
wherein the first intensity is greater than the third intensity, and the second intensity is less than the fourth intensity.

2. The backlight module of claim 1, wherein the first beam angle is greater than or equal to 120 degrees and less than or equal to 160 degrees, and the second beam angle is greater than or equal to 15 degrees and less than or equal to 40 degrees.

3. The backlight module of claim 1, wherein the first light emitting unit has a first maximum light intensity, the second light emitting units have a second maximum light intensity,
wherein the first intensity is 100% of the first maximum light intensity, and the second intensity is less than or equal to 20% of the second maximum light intensity, wherein the third intensity is greater than or equal to 25% of the first maximum light intensity and less than or equal to 50% of the first maximum light intensity, wherein the fourth intensity is 100% of the second maximum light intensity.

4. The backlight module of claim 1, wherein a number of the plurality of second light emitting units is four, and the first light emitting unit is disposed between two of the second light emitting units and between other two of the second light emitting units.

5. The backlight module of claim 4, wherein the backlight units comprise a first backlight unit and a second backlight unit which is adjacent to the first backlight unit, wherein orientation of the four second light emitting units of the second backlight unit is rotated 45 degrees relative to orientation of the four second light emitting units of the first backlight unit.

6. The backlight module of claim 1, wherein an area of a lower surface of the support unit is less than an area of an upper surface of the first light emitting unit.

7. The backlight module of claim 6, further comprising an optical structure disposed above the support unit and directly contacting the support unit.

8. The backlight module of claim 1, wherein an area of the upper surface of the polygonal frustum is less than or equal to half an area of the lower surface of the polygonal frustum, wherein the area of the lower surface of the polygonal frustum is greater than or equal to one-tenth the area of the upper surface of the first light emitting unit and less than or equal to four-fifths the area of the upper surface of the first light emitting unit.

9. The backlight module of claim 1, wherein the particular degree is equal to 45 degrees.

10. The backlight module of claim 1, wherein the lower surface of the polygonal frustum has an inner circle, a diameter of the inner circle is equal to y micrometer, the polygonal frustum has a height of x micrometer, and x is 0.5 to 1 times of y.

11. The backlight module of claim 1, wherein in the second mode, a viewing angle according to the backlight units is greater than or equal to 30 degrees and less than or equal to 45 degrees.

12. A display device comprising:
a back plate;
a middle frame disposed on the back plate;
a substrate encompassed by the back plate; and
a plurality of backlight units disposed on the substrate, wherein each of the backlight units comprises:
a first light emitting unit having a first beam angle;
a plurality of second light emitting units, wherein a size of each of the second light emitting units is smaller than a size of the first light emitting unit, each of the second light emitting units has a second beam angle which is narrower than the first beam angle; and
a support unit disposed on the first light emitting unit, wherein the support unit is a polygonal frustum having an upper surface and a lower surface, the upper surface of the polygonal frustum is rotated a particular degree relative to the lower surface of the polygonal frustum, and the particular degree is greater than 0 degree,
wherein in a first mode, a light intensity of the first light emitting unit is equal to a first intensity, a light intensity of the second light emitting units is equal to a second intensity,
wherein in a second mode, the light intensity of the first light emitting unit is equal to a third intensity, the light intensity of the second light emitting units is equal to a fourth intensity,
wherein the first intensity is greater than the third intensity, and the second intensity is less than the fourth intensity.

13. The display device of claim 12, further comprising a plurality of optical structures supported by the middle frame.

14. The display device of claim 13, wherein the optical structures comprise a light guide plate, a diffuser, or a polarizer.

15. The display device of claim 13, wherein one of the optical structures directly contacts the support unit.

16. The display device of claim 13, wherein a gap is formed between one of the optical structures and the support unit.

17. The display device of claim 12, wherein reflective material is formed on an upper surface of the substrate.

* * * * *